Sept. 13, 1966        E. A. WAHL        3,272,024

ELECTRO-MECHANICAL GYRATOR

Filed Aug. 31, 1964        3 Sheets-Sheet 1

EUGENE A. WAHL
INVENTOR.

BY
ATTORNEY

Sept. 13, 1966 E. A. WAHL 3,272,024
ELECTRO-MECHANICAL GYRATOR
Filed Aug. 31, 1964 3 Sheets-Sheet 2

EUGENE A. WAHL
INVENTOR.

BY *Rudolph F. Janick*
ATTORNEY

Sept. 13, 1966          E. A. WAHL                    3,272,024
              ELECTRO-MECHANICAL GYRATOR
Filed Aug. 31, 1964                          3 Sheets-Sheet 3
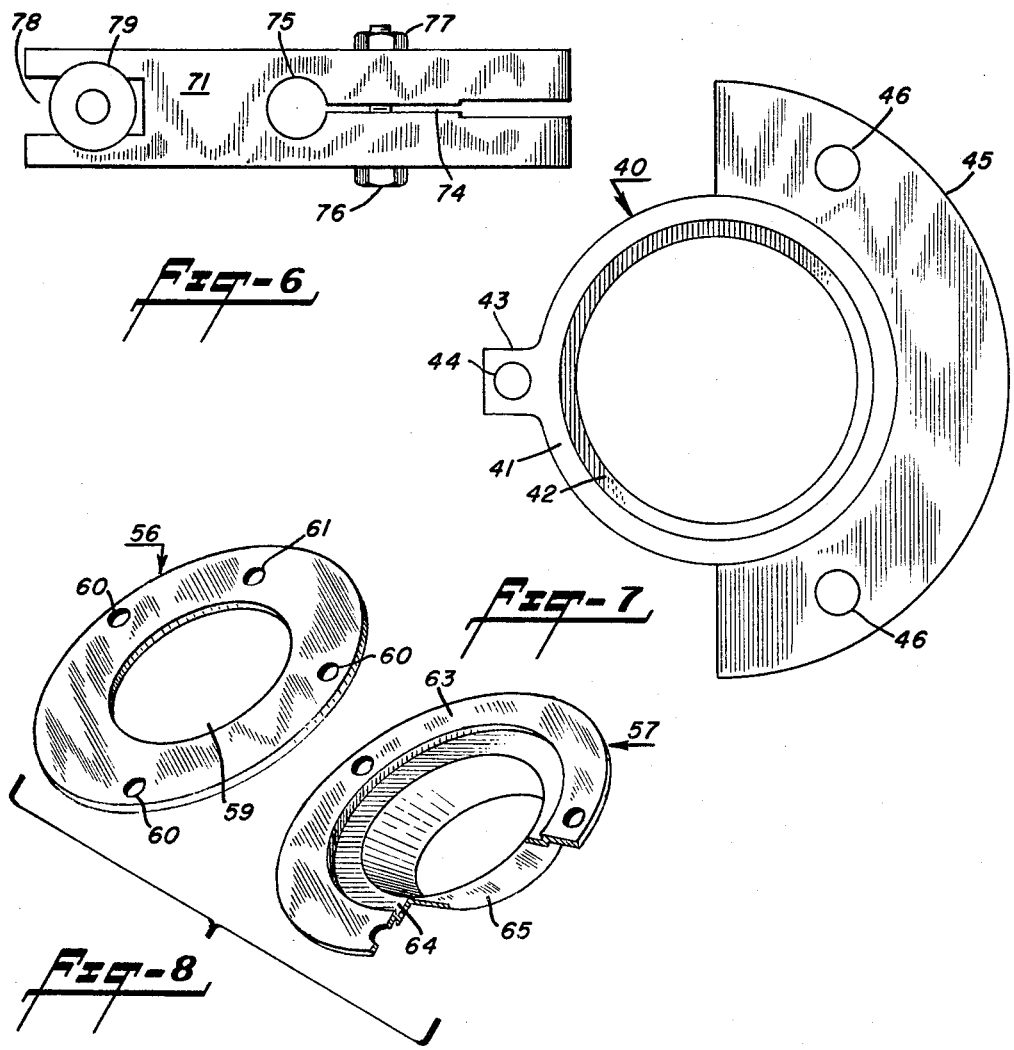
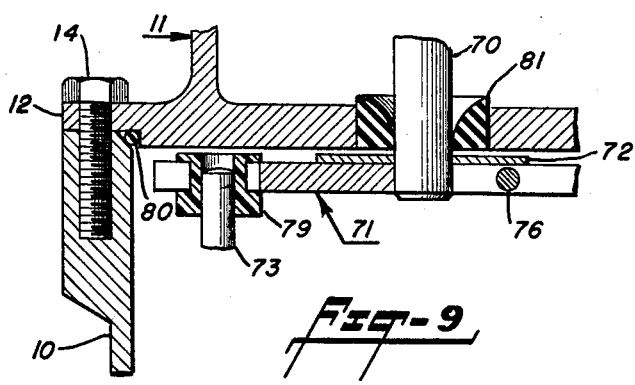
EUGENE A. WAHL
INVENTOR.
BY Rudolph J. Quick
ATTORNEY

United States Patent Office 3,272,024
Patented Sept. 13, 1966

3,272,024
ELECTRO-MECHANICAL GYRATOR
Eugene A. Wahl, 294 Forest Ave., Glen Ridge, N.J.
Filed Aug. 31, 1964, Ser. No. 393,296
8 Claims. (Cl. 74—87)

This invention relates to a device for producing mechanical vibrations and more particularly to an electro-mechanical gyrator of novel construction and improved operation.

Gyrators of the class to which this invention is directed are designed to be secured to a vibratorily-mounted structure for the purpose of vibrating the structure at a given frequency and amplitude. In general, such gyrators comprise one or more weights mounted eccentrically on a shaft which is rotated by an electric motor. In the case of a relatively massive structure, the dynamic forces involved are of such magnitudes as to place a heavy load on the bearings associated with the shaft carrying the weights. In consequence, bearing lubrication and heat generation are critical problems which effect the operating life of the device.

There are available electro-mechanical gyrators of various types, the most commonly used type being known as the integral motor type, that is, the electric drive motor and the rotatable, eccentric weight system are enclosed within a single housing. In the prior devices, grease is utilized as the lubricating medium. However, this presents a problem as the device must be regreased periodically at relatively short intervals, depending upon the particular load. At such times, the device often is over-lubricated or under-lubricated. In any event, even with a proper amount of lubrication, grease tends to be forced out of the path of the relatively rotating elements, thereby resulting in overheating and damage, particularly to the bearings. Also, heavily loaded bearings generate considerable localized heat and the resulting temperature gradients make it difficult to use optimum bearing fits and clearances. Thus, in the case of a grease lubricated gyrator, it is necessary to use bearings having a radial clearance of the order of 0.002", to prevent seizing due to unequal expansion of the bearing balls and races.

An electro-mechanical gyrator made in accordance with this invention utilizes circulating oil as the lubricant, which provides temperature equalization between the bearings and their housing. This permits the use of bearings having a total radial clearance of only 0.0005", which increases substantially the operating life of the device. The gyrator is so constructed as to permit the use of a standard electric motor having a desired power rating and electrical characteristics. Such motor is removably secured to a housing, or pot, carrying the eccentrically-mounted weights and associated bearings, whereby only one or the other of such major components can readily be replaced in the event it becomes inoperative.

An object of this invention is the provision of a gyrator of novel construction and particularly adapted for heavy load applications.

An object of this invention is the provision of an electro-mechanical gyrator wherein the drive motor and the eccentrically-mounted weight system are housed in separate housings which are removably secured together.

An object of this invention is the provision of an electro-mechanical gyrator wherein the shaft of the drive motor is removably coupled to an eccentrically-mounted weight system contained within a housing and wherein the bearings of the system are lubricated by circulating oil.

An object of this invention is the provision of a gyrator comprising bearing means disposed in a housing carrying oil, a weight mounted for eccentric rotation relative to the bearing means, an electric motor having a drive shaft mechanically coupled to the weight, and means rotatable with said weight and effective to circulate oil through the bearing means.

These and other objects and advantages of the invention will become apparent from the following description when taken with the accompanying drawings. It will be understood, however, that the drawings are for purposes of illustration and are not to be construed as defining the scope or limits of the invention, reference for the latter purposes being had to the claims appended hereto.

In the drawings wherein like reference characters denote like parts in the several views:

FIGURE 6 is a plan view of the drive coupling drawn to the same scale as FIGURE 4;

FIGURE 7 is plan view of the bearing housing drawn to the same scale as FIGURE 4;

FIGURE 8 is an exploded isometric view of the two discs forming the oil pump and drawn to the same scale as FIGURE 4; and FIGURE 9 is a fragmentary, cross-sectional view, similar to FIGURE 4 and showing an arrangement to prevent oil from entering into the motor when the gyrator is designed for high speed operation.

Figure 1:
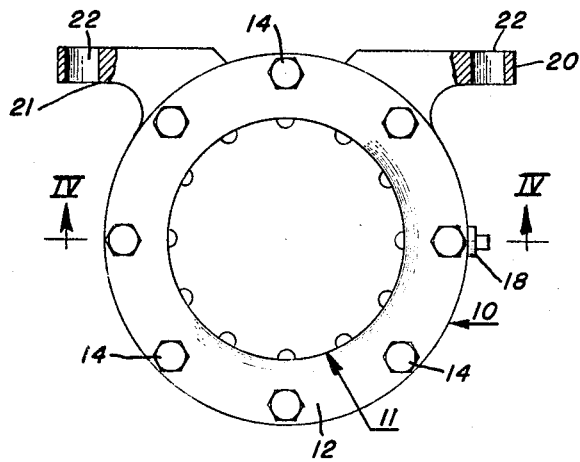
FIGURE 1 is a top plan view of an electro-mechanical gyrator made in accordance with this invention.
Figure 2:
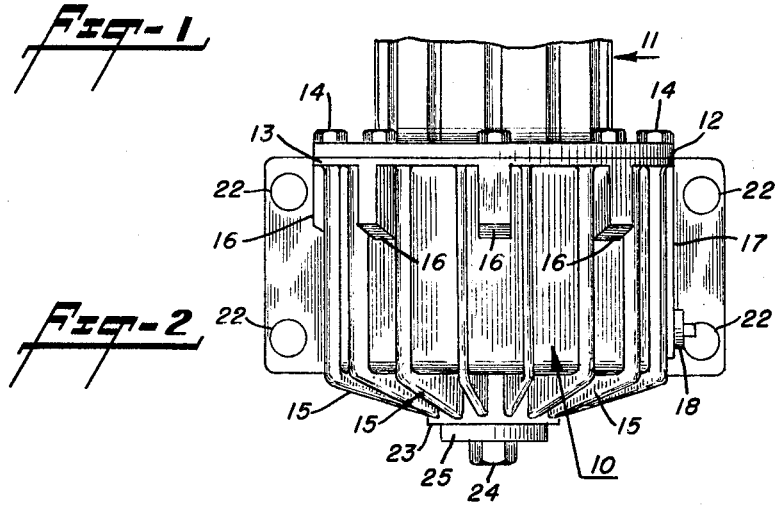
FIGURE 2 is a side elevational view thereof with a portion of the motor broken away.
Figure 3:
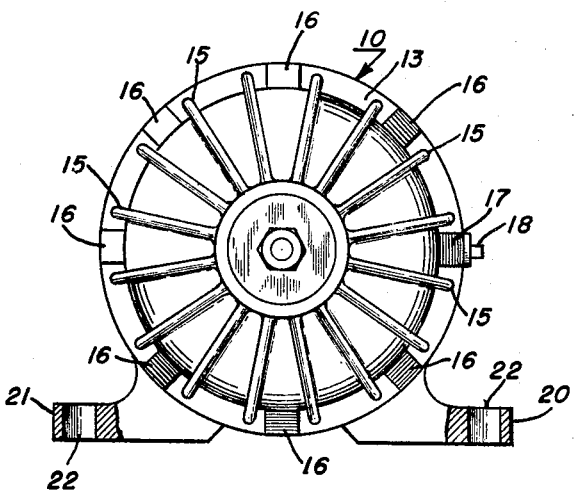
FIGURE 3 is a bottom plan view thereof.

Reference now is made to FIGURES 1–3, showing a housing, or pot 10, which carries the mechanical components of the gyrator, and the housing 11 of the electric drive motor. The motor is of standard design having electrical characteristics suitable for the application of the particular gyrator, with the housing provided with an integral flange 12. Such flange is bolted to a complementary flange 13, formed integral with the pot 10, by a plurality of bolts 14 which pass through clearance holes in the motor housing flange and into threaded holes formed in the gyrator housing flange.

The pot 10 is cast of a suitable material having a good shock resistant characteristic, preferably ductile iron, and includes integral heat-dissipating ribs 15 which extend radially from the side wall and along the bottom, substantially as shown. Additionally, the pot includes integral, thickened portions 16, which are joined to the pot flange 13 and extend downwardly therefrom. These thickened portions constitute bosses and each is provided with a tapped hole for receiving one of the fastening bolts 14. One such thickened portion 17 extends substantially the full length of the pot and has a radially-extending threaded hole formed therein for receiving a pipe plug 18, for purposes to be described hereinbelow. Cast integral with the pot 10 are a set of sturdy lugs 20, 21, which constitute a mounting plate for the device, each lug being provided with a set of spaced holes 22. An axial, cylindrical boss 23 extends from the bottom wall of the pot and is provided with a hole for accommodating a bolt 24 having a hexagonal head welded to a relatively thick washer 25.

Figure 4:
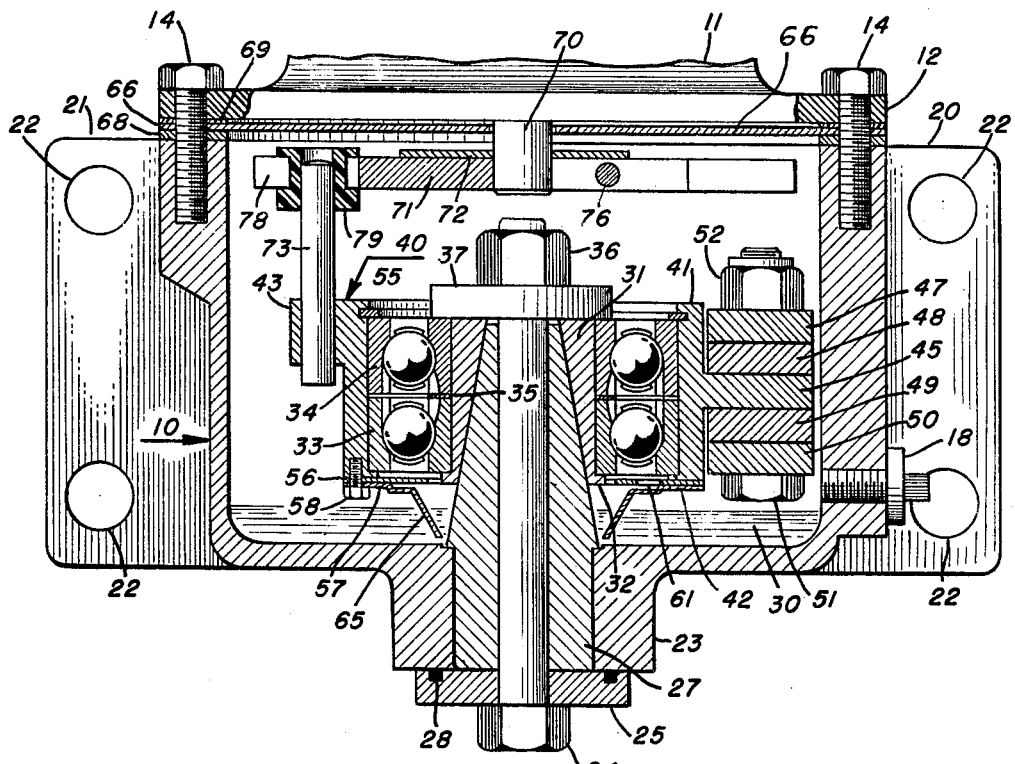
FIGURE 4 is an enlarged cross-sectional view taken along the line IV—IV of FIGURE 1 and showing the internal components and their assembly in the gyrator housing.

Reference now is made to FIGURE 4 which is a vertical, cross-sectional view taken along the line IV—IV of FIGURE 1, but with only a portion of the motor housing 11 shown in elevation. A bushing 27 is shrunk-fit into an axial hole formed in the boss 23. The upper, conical portion of this bushing has a maximum diameter exceeding that of the lower portion, thereby forming a shoulder which abuts against the bottom wall of the pot 10. The washer 25, which is welded to the head of the bolt 24, is provided with a circular groove carrying an O ring gasket 28, which gasket is compressed between the washer and the face of the boss 21 to prevent leakage of the oil 30.

Mounted on the conical portion of the bushing 27 is a bearing shaft 31, which has a corresponding conical bore. This bearing shaft has an integral, outwardly-directed, circular shoulder 32 formed at the lower end thereof, said shoulder providing a rest for the inner race of the lower bearing 33. The inner race of the upper bearing 34 rests upon a bearing spacer 35, which, in turn, rests upon the corresponding race of the lower bearing. The two bearings are press-fitted on the bearing shaft 31 and the bearing shaft is firmly secured in position by the nut 36 (threaded onto the bolt 24) and the upper clamp washer 37. Specifically, the washer 37 engages the inner race of the upper bearing 34 so that when the nut 36 is fully tightened, the bearing shaft 31 is pressed downwardly along the conical surface of the bushing 27 to the fullest possible extent. When the bearing shaft is so seated on the bushing 27, its lower surface is spaced about 1 inch from the bottom of the pot 10.

Figure 5:
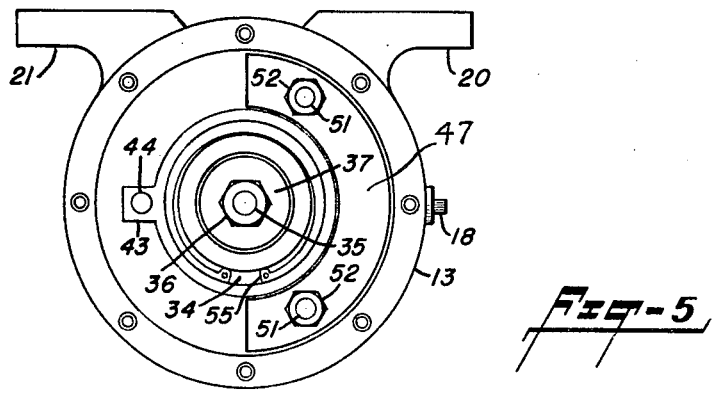
FIGURE 5 is a plan view drawn to the same scale as FIGURES 1–3 and looking into the gyrator housing and with the motor and drive coupling omitted.

The bearing housing, identified by the numeral 40 in FIGURE 4, is shown in the plane view of FIGURE 7. Such housing is a unitary casting comprising a hollow, cylindrical portion 41 terminating in an inwardly-directed ledge 42 at the bottom thereof and a radially-extending lug 43 at the top thereof, said lug having a longitudinal hole 44 extending therethrough. An integral fin 45, of substantial thickness, extends from the cylindrical portion 41, said fin substantially bisecting the cylindrical portion and having an angular extent of substantially 180 degrees. In a gyrator intended for light load applications, the fin 45 constitutes the eccentrically-mounted weight. However, such fin is provided with spaced holes 46 (see FIGURE 7) whereby additional weights 47–50 may be secured thereto by bolts 51 and nuts 52 (see FIGURES 4 and 5), thereby increasing the centrifugal thrust of the device.

Referring, again, specifically to FIGURE 4, the ball bearings 33 and 34 are press-fitted onto the bearing shaft 31 and also into the bearing housing 40, which requires precise machining of the parts. To obviate the need for a precision machining of these parts, the bearing races can be secured to the bearing shaft and bearing housing by means of a suitable, liquid, metal-to-metal binder. In such case, the retaining ring 55 (see also FIGURE 7), serves the purpose of preventing the bearing housing 40 from slipping down over the outer races of the bearings in the event of failure of the binder.

As shown in FIGURE 4, the level of the oil 30 is below the bearings. Such oil level is approximately ½ inch and the location of the pipe plug 18 is such as to prevent a filling of the pot above such level.

The oil pump of the device comprises a pair of relatively thin metal discs 56 and 57 secured to the lower surface of the bearing housing 40 by means of three fastening screws, one such screw 58 being visible in this particular view. The construction and form of these discs are best shown in the isometric view of FIGURE 8. The upper disc 56 is flat and provided with a central hole 59, three holes 60, for receiving the fastening screws, and a hole 61 for the passage of the oil upwardly to the bearings. The lower disc 57 has a flat cylindrical flange portion 63 provided with three holes matching the holes 60 in the upper disc. The disc 57 is press-formed to provide a recessed, cylindrical portion 64 terminating in a conical portion 65.

When the two discs are fastened to the bearing housing, as shown in FIGURE 4, the end of the conical portion 65, of the lower disc, is spaced from the bottom surface of the pot 10 and the proximate conical wall of the bushing 27 by a distance of about ⅛ inch, and the oil hole 61 of the upper disc is positioned between the races of the lower bearing 33. As the eccentric weight assembly rotates, oil is carried up the incline of the conical portion 65 by centrifugal force and enters into the space between the two discs. The single hole 61, in the upper, flat disc, provides the escape for the oil, pressurized by centrifugal force, into the bearing assembly. Centrifugal force within the bearing assembly also serves to hold the oil as a film against the inner surfaces of the outer bearing races. The slight pressure imparted to the oil by the disc assembly serves to replenish or renew this oil film, continuously, thereby providing temperature equalization between the bearings and their housings, which is an important consideration in applications wherein the bearings are heavily loaded. The described arrangement adequately lubricates the bearings and permits the use of optimum bearing fits and clearances which is conducive to longer operating life. In the described construction, the bearings have a total radial clearance of only 0.0005″, whereas grease-lubricated bearings, in a comparable application, require a clearance of 0.002″.

As shown in FIGURE 4, the open end of the pot 10 is closed by a metal cover plate 66 positioned over a full face gasket 68, preferably made of an oil-resistant rubber. A second gasket 69, preferably made of vellinoid, is positioned between the cover plate and the flange 12 of the motor housing 11. Thus, when the motor is secured to the pot, by the bolts 14, the pot is sealed, except for a clearance opening provided in the cover plate for the motor drive shaft 70. An oil-flinger disc 72, secured to the drive dog 71, serves to keep oil away from the motor shaft.

The drive dog 71 is shown in plan view in FIGURE 6. It comprises a sturdy metal bar having a radial slot 74 terminating in a central hole 75 for receiving the motor drive shaft. A bolt 76 and nut 77 provide the means for securely attaching the drive dog to the motor shaft. A second, wider slot 78 slidably accommodates a nylon bushing 79.

Referring again to FIGURE 4, the lower end of the drive pin 73 is force-fitted into the hole formed in the lug 43 of the bearing housing 40. The upper end of this drive pin is snugly received in the hole of the nylon bushing 79. Thus, rotation of the drive dog 71 results in a corresponding rotation of the bearing housing 40 and the eccentrically-mounted weights. Inasmuch as the drive pin 73 is diametrically opposite the weights, and since the nylon bushing is slidably disposed with the radial slot 78, no part of the centrifugal force (generated by the rotation of the weights) can be transmitted to the drive dog. The nylon bushing merely slides radially relative to the motor drive shaft in response to any radial stresses developed at this point.

The fragmentary, cross-sectional view, FIGURE 9, illustrates a modification of the oil-sealing arrangement. In this arrangement, the motor housing flange 12 is provided with a circular step which squeezes an O ring gasket 80 against a 45 degree clamper provided on the upper inside edge of the pot 10. An inverted garlock seal 81, carried by the flange 12, encircles the motor drive shaft 70 to prevent oil from creeping along the shaft and into the motor.

Having now described the invention, those skilled in this art will be able to make various changes and modifications without departing from the spirit and scope of the invention as recited in the following claims.

I claim:

1. A gyrator comprising,
 (a) a main housing open at one end,
 (b) a central, vertical support secured to and extending into the housing, said support having a conical surface and an axial hole extending therethrough,
 (c) a bearing shaft having a matching conical hole extending axially therethrough and carried by the said support, said bearing shaft having an integral outwardly-extending shoulder, (d) bearing means carried by and encircling said bearing shaft, said bearing means resting upon the said shoulder, (e) means securing the bearing shaft in fixed position relative to the said support, said means comprising a bolt passing through the said axial hole, a washer, and a nut threaded onto the bolt and pressing the washer into engagement with the said bearing means, (f) a bearing housing carried by said bearing means and having an outwardly-extending radial flange, (g) power means having a rotatable drive shaft extending into the housing in spaced, axial alignment with the said bearing shaft, and (h) means mechanically coupling the said drive shaft to the said bearing housing.

2. The invention as recited in claim 1, wherein the means mechanically coupling the drive shaft to the bearing housing comprises a rectangular bar secured to the drive shaft, said bar having a radial slot formed at one end; a bushing of resilient material carried by said bar and slidable in said slot; a lug extending radially from the said bearing housing and having a hole formed therein; and a drive pin having one end extending into the said bushing and the other end force-fitted into the hole formed in the lug.

3. The invention as recited in claim 2, wherein the said lug is disposed diametrically opposite to the said flange.

4. An electro-mechanical gyrator comprising, (a) a cylindrical housing open at one end terminating in an outwardly-directed flange, (b) a central support secured to the bottom of said housing and extending upwardly therein, said support having a conical surface, (c) a bearing shaft having a matching conical hole extending axially therethrough and positioned over the conical surface of the central support, (d) means securing the bearing shaft to the central support with the lower end of said shaft spaced a predetermined distance from the bottom of the cylindrical housing, (e) bearing means carried by and secured to said bearing shaft, (f) a bearing housing encircling said bearing means and having an integral flange extending radially from one side, said flange having an arcuate length of substantially 180 degrees, (g) means securing the bearing housing to said bearing means, (h) an electric motor having a housing provided with a flange corresponding to that of the cylindrical housing and a drive shaft extending into the cylindrical housing, (i) means securing together the corresponding flanges of the motor housing and the cylindrical housing, (j) coupling means mechanically coupling the motor drive shaft to the said bearing housing, (k) lubricating oil in the cylindrical housing, and (l) pumping means carried by the bearing housing and effective upon rotation of said housing to circulate oil upwardly through said bearing means.

5. The invention as recited in claim 4, wherein the flange of the bearing housing lies substantially in a median plane passing horizontally through said bearing means.

6. The invention as recited in claim 5, including weights positioned on either side of the bearing housing flange and secured thereto, said weights having radial and arcuate dimensions corresponding substantially to those of the said flange.

7. The invention as recited in claim 4, wherein the said coupling means comprises a radial lug extending from the side of the bearing housing opposite to that of the flange, said lug having a hole extending therethrough; an elongated bar centrally secured to the motor drive shaft, said bar having a radial slot formed at one end; a resilient bushing carried by said bar and slidable within the said slot; and a drive pin having one end extending into the said resilient bushing and the other end force-fitted into the hole in said lug.

8. The invention as recited in claim 4, wherein the oil has a depth less than said predetermined spacing, and wherein the said pumping means comprises a pair of discs secured to the lower surface of said bearing means, the upper disc being flat and having an opening communicating with the bearing means, and the lower disc having an annular recessed portion spaced from the upper disc, which annular portion terminates in a central conical portion having a truncated apex extending into the oil but spaced from the bottom of the cylindrical housing and the said central support.

References Cited by the Examiner

UNITED STATES PATENTS

| | | | |
|---|---|---|---|
| 1,602,734 | 10/1926 | Weston | 74—86 |
| 1,820,017 | 8/1931 | Foulks | 308—236 X |
| 2,599,496 | 6/1952 | Soldan | 74—87 |
| 2,655,416 | 10/1953 | Annen | 308—187 X |
| 2,922,309 | 1/1960 | Adams | 74—61 |

MILTON KAUFMAN, *Primary Examiner.*

BROUGHTON G. DURHAM, *Examiner.*

D. H. THIEL, *Assistant Examiner.*